(12) United States Patent
Egan, III et al.

(10) Patent No.: US 6,617,720 B1
(45) Date of Patent: *Sep. 9, 2003

(54) INTEGRATED PAPER PULP AND PROCESS MACHINERY HAVING INTEGRATED DRIVE AND CONTROL AND METHODS OF USE THEREOF

(75) Inventors: John J. Egan, III, Centerville, OH (US); Christopher L. Demler, Lebanon, OH (US)

(73) Assignee: Kadant Black Clawson Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,894

(22) PCT Filed: Apr. 8, 1999

(86) PCT No.: PCT/US99/07729

§ 371 (c)(1),
(2), (4) Date: Oct. 6, 2000

(87) PCT Pub. No.: WO99/52197

PCT Pub. Date: Oct. 14, 1999

Related U.S. Application Data

(60) Provisional application No. 60/081,033, filed on Apr. 8, 1998.

(51) Int. Cl.[7] ............................ H02K 5/132; H02K 7/09; B02C 7/16

(52) U.S. Cl. ...................... 310/67 R; 310/87; 310/90.5; 210/380.3; 241/259.1; 417/423.7

(58) Field of Search ................................. 310/166, 113, 310/67 R, 87, 90.5; 210/380.3; 417/355, 423.7; 241/259.1, 30

(56) References Cited

U.S. PATENT DOCUMENTS

| | | | |
|---|---|---|---|
| 2,666,368 A | 1/1954 | Staege et al. | ................. 241/37 |
| 2,986,434 A | 5/1961 | Baxter, Jr. | ................. 241/37 |

(List continued on next page.)

FOREIGN PATENT DOCUMENTS

| | | | |
|---|---|---|---|
| GB | 2301399 A | 4/1996 | ........... F04D/13/06 |

*Primary Examiner*—Burton Mullins
(74) *Attorney, Agent, or Firm*—Wegman, Hessler & Vanderburg

(57) ABSTRACT

The invention pertains to equipment and methods in which the rotatable drive member of a variable speed motor, such as a switched reluctance motor, carries a rotatable pulp processing element (10). Magnetic bearings (22, 24) levitatingly support both the rotatable drive member (15) and associated rotatable pulp processing element (41) and control axial and radial positionning thereof relative to the axis of rotation of the drive member.

24 Claims, 4 Drawing Sheets

U.S. PATENT DOCUMENTS

| | | | |
|---|---|---|---|
| 3,276,701 A | * 10/1966 | Fisher | 241/146 |
| 3,506,199 A | 4/1970 | Hayward | 241/37 |
| 3,843,065 A | 10/1974 | Horstman et al. | 241/244 |
| 3,932,069 A | 1/1976 | Giardini et al. | 417/420 |
| 4,057,369 A | 11/1977 | Isenberg et al. | 417/365 |
| 4,171,101 A | 10/1979 | Seifert et al. | 241/30 |
| 4,246,108 A | 1/1981 | Croopnick et al. | 209/291 |
| 4,253,053 A | 2/1981 | Ray et al. | 318/701 |
| 4,306,164 A | 12/1981 | Itoh et al. | 310/49 R |
| 4,348,619 A | 9/1982 | Ray et al. | 318/310 |
| 4,513,790 A | 4/1985 | Sainen et al. | 139/110 |
| 4,585,037 A | 4/1986 | Kimbara | 139/1 E |
| 4,593,236 A | 6/1986 | Oesterle et al. | 318/7 |
| 4,684,073 A | 8/1987 | Berggren | 241/247 |
| 4,688,998 A | 8/1987 | Olsen et al. | 417/356 |
| 4,700,900 A | * 10/1987 | Rowland | 241/37 |
| 4,820,980 A | 4/1989 | Dodson-Edgars | 324/207 |
| 4,959,596 A | 9/1990 | MacMinn et al. | 318/254 |
| 4,998,052 A | 3/1991 | Erdman et al. | 318/701 |
| 5,013,460 A | 5/1991 | Meredith | 210/770 |
| 5,087,171 A | 2/1992 | Dosch et al. | 415/169.1 |
| 5,170,821 A | 12/1992 | Yoshida | 139/99 |
| 5,173,257 A | 12/1992 | Pearson | 422/3 |
| 5,202,610 A | 4/1993 | Frye et al. | 318/6 |
| 5,288,215 A | 2/1994 | Chancellor et al. | 417/423.7 |
| 5,347,190 A | 9/1994 | Lewis et al. | 310/90.5 |
| 5,385,007 A | 1/1995 | Hartel et al. | 57/76 |
| 5,385,581 A | 1/1995 | Bramm et al. | 623/3 |
| 5,386,166 A | 1/1995 | Reimer et al. | 310/90.5 |
| 5,398,877 A | 3/1995 | Ziangzhi | 241/163 |
| 5,424,595 A | 6/1995 | Preston et al. | 310/90.5 |
| 5,469,039 A | 11/1995 | Stephenson et al. | 318/701 |
| 5,514,924 A | 5/1996 | McMullen et al. | 310/90.5 |
| 5,530,306 A | 6/1996 | Ueyama | 310/90.5 |
| 5,548,173 A | 8/1996 | Stephenson | 310/181 |
| 5,565,722 A | 10/1996 | Rubner et al. | 310/90.5 |
| 5,578,880 A | 11/1996 | Lyons et al. | 310/90.5 |
| 5,625,240 A | 4/1997 | Bernus | 310/90.5 |
| 5,692,882 A | 12/1997 | Bozeman, Jr. et al. | 417/45 |
| 5,717,316 A | 2/1998 | Kawai | 322/46 |
| 5,726,516 A | 3/1998 | Randall | 310/261 |
| 5,726,560 A | 3/1998 | Eakman et al. | 322/89 |
| 5,729,065 A | 3/1998 | Fremery et al. | 310/90.5 |
| 5,729,066 A | 3/1998 | Soong et al. | 310/90.5 |
| 5,857,496 A | 1/1999 | Brown et al. | 139/110 |
| 5,859,518 A | 1/1999 | Vitunic | 318/701 |
| 5,866,962 A | 2/1999 | Kim | 310/68 B |
| 5,887,808 A | * 3/1999 | Lucas | 241/188.1 |
| 5,947,394 A | 9/1999 | Egan, III et al. | 241/30 |

* cited by examiner

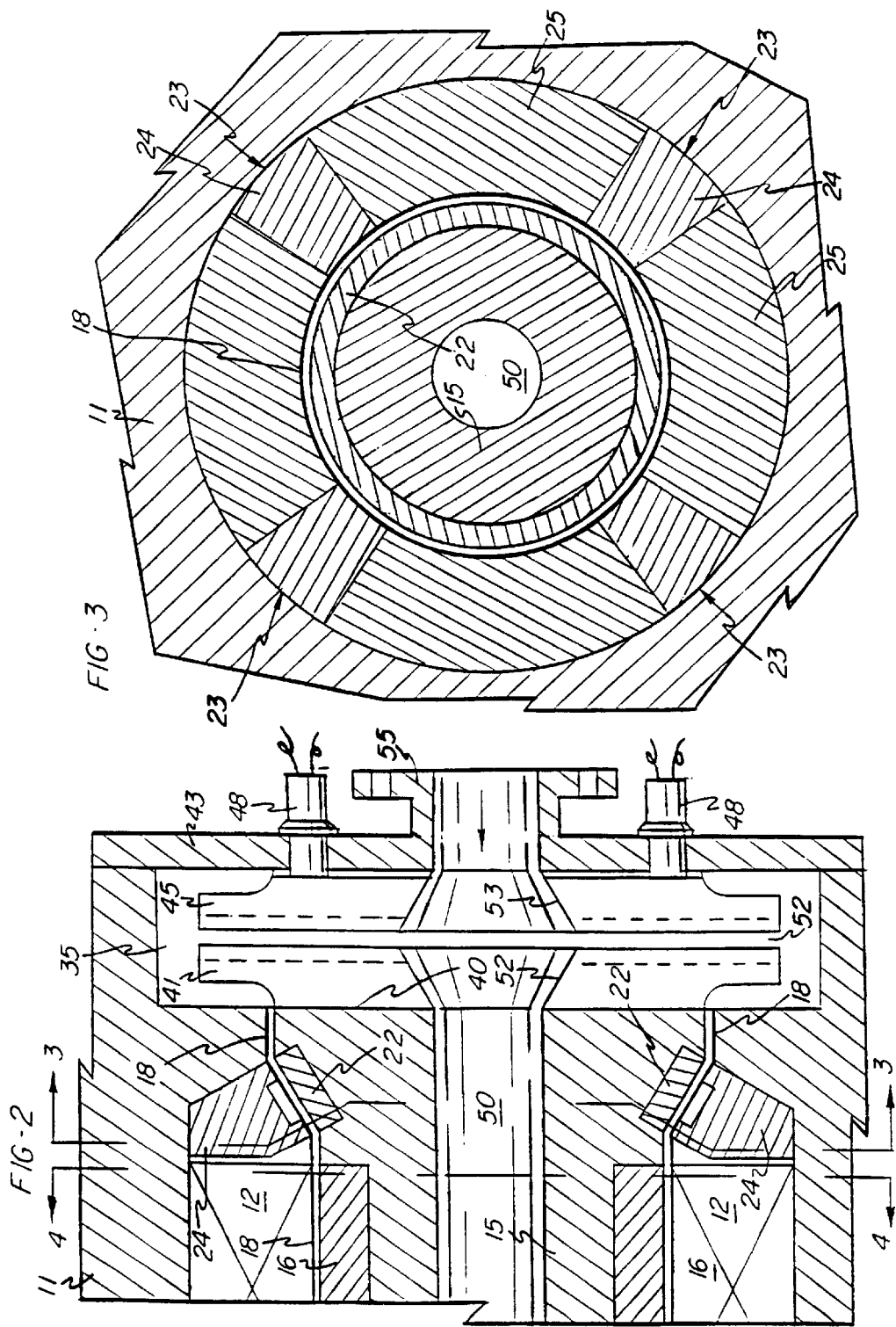

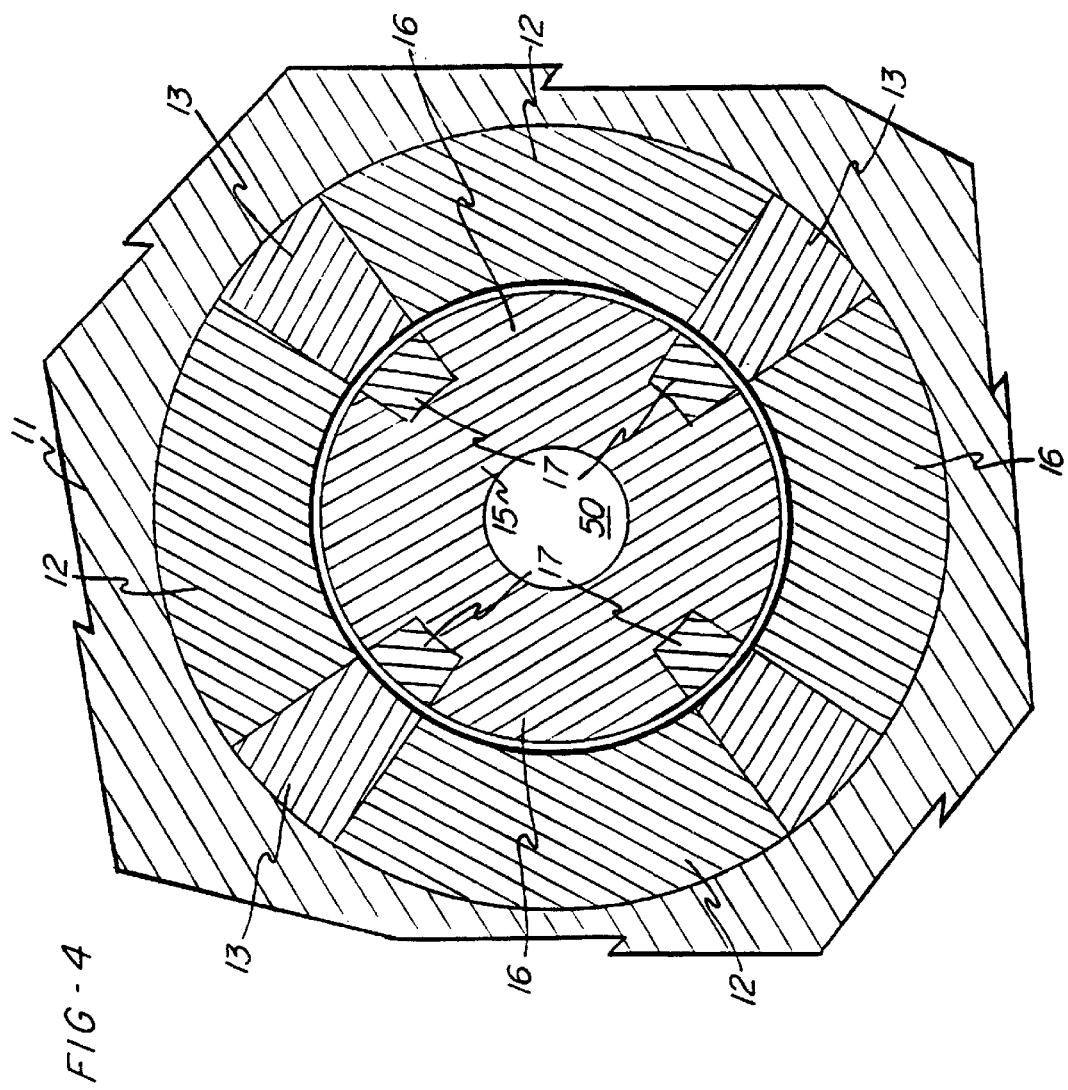

INTEGRATED PAPER PULP AND PROCESS MACHINERY HAVING INTEGRATED DRIVE AND CONTROL AND METHODS OF USE THEREOF

This application claims the benefit of provisional application 60/081,033 filed Apr. 8, 1998.

BACKGROUND OF THE INVENTION

In the field of processing paper pulp, either by means of reclaiming pulp from a previously used paper product or from recovering pulp from digested wood chips, the process machinery and motor drive systems have changed little since the turn of this century. That is to say, paper pulp screening and refining apparatus, for example, primarily consists of a traditionally frame mounted rotating component, supported on its own mechanical support bearings, and provided with an external shaft to which the rotating component is driven. Generally, such pulp processing machinery, including but not limited to refiners, pulp pressure screens and the like, requires large amounts of power to be applied to such rotating components, either through direct shaft coupled or belted electric drive motors. Such arrangements, as commonly known, are inherently inefficient, expensive and potentially dangerous for at least the following reasons:

1. Four or more sets of support bearings and related bearing support structures are required, usually at least two for the rotating components and two for the motor armature.
2. Many pulp processing machines require that the paper pulp or other material to be processed be brought into a relatively central position and then moved in a relatively radial outward direction during processing. Such machines would benefit greatly from being able to bring in the material to be processed on an axial basis for uniform distribution, but that is not practical in most existing equipment designs due to the fact that the rotor shaft is solid and is positioned on the axis, and therefore requires that the material be brought in at an off-axis basis. This requires a needlessly greater complexity.
3. Since the process material in many instances cannot be brought in on the axis of rotation, it becomes necessary to provide openings in the rotating components so that material may be fed in a balanced condition to two or more working portions of the rotating structure. For example, in a refiner, the material must flow to the remote face of the center refining disk through radially offset openings in the disk provided for this purpose.
4. The separate drive motor requires external or open couplings shafts, pulleys, belts and like components, all of which require shielding to protect against possible injury, and requires seals to isolate the material being processed from the external rotating components.

The structural support arrangement for the rotating components of paper process machinery does not permit or enable ease of adjustment of the relative position of rotating components. For example, rotating components may be cone-shaped, such as in paper refiners, and refiner clearances are adjusted only by laboriously making corrections in the axial position of a non rotating component. The same is true for disk refiners where a radial rotor for refining paper stock is positioned between plates of an opposed pair of stator members. In such cases, the practice has been to provide auxiliary systems for moving the stator elements, as desired, while leaving the rotor suspended in a fixed or uncontrolled plane on its rotating support mechanism.

A further impediment to the creation of integrated paper pulp processing machine is the fact that drive motors have been traditionally designed for generic purposes, by motor manufacturers generally unfamiliar with the peculiar or particular requirements of the paper pulp processing industry, and likewise, paper pulp processing machinery has been designed with the underlying intent or understanding that such machinery will be driven by separately designed electric motor drives. Such conditions have provided little opportunity for integration of the common functions inherent in motor drive and in pulp processing rotary machinery.

SUMMARY OF THE INVENTION

This invention is an improvement to current rotating pulp processing machinery. It is designed to be used in the pulp and paper industries where equipment now incorporates a combination of oil or grease lubricated rotating assemblies and an external drive motor. This invention integrates a variable speed motor into the structure of the pulp or paper preparation equipment. The integration makes use of magnetic bearing systems for supporting the rotating component, both of the motor and of the pulp treating equipment and integrates, in some instances, the functions of pulp treating and driving torque or power.

In a preferred system, a rotor is supported on magnetic bearings, and the rotor as well as the bearings may be immersed or submerged partially or fully within the liquid being processed. The bearings levitate the rotor of the motor and control the rotor's orbit and position. The rotor itself becomes, or directly drives, the rotating pulp processing component. Both rotor and bearing may be cooled by the process liquid.

More particularly, use is made of magnetic bearings and an integrated variable speed motor, such as a switched reluctance motor. The control of the magnetic bearings and the motor may themselves be integrated into a common control system for the complete unit.

By integrating the motor rotor with the process rotor, and utilizing the available magnetic bearing control systems, the position of the rotor may be controlled by the magnetic bearing systems to improve the performance of the process apparatus and by providing fine tuning of the rotor position in equipment which heretofore has not had this capability. A further advantage of the system is that the motor rotor now becomes an integral part of the system within the pulp slurry and allows for the elimination of an external rotating assembly. Therefore a totally enclosed system is possible.

Switched reluctant motor technology is preferred. The rotors are not complicated and are light in weight. The electric current switching circuits are reliable. The rotors do not use windings or permanent magnets. Speed and rotation can be quickly controlled by the motor controller, thereby improving efficiency and providing high starting torque. Therefore, a pulp treating system has the advantages of an accurate variable speed control that permits process operation optimization with energy savings, pulp quality optimization, and substantial savings in installation costs, weight, floor space, and safety risks.

A further significant advantage resides in the fact that by combining the control of the process machinery with the control of the motor, the quality of product may be more fully controlled by a computer program.

Another object and advantage of the invention is that the rotating and non-rotating parts do not contact each other during use so part wear and power loss are minimized. Utilization or duty cycle time is maximized.

The quality of the product, such as paper pulp, can be tuned, while the critical dimensions in the relation between the rotor and the stator elements may be maintained throughout the life of the unit so that performance, if desired, can remain constant. Algorithms can be developed to improve unit performance where a particular programmed rotor orbit may be found to be beneficial over that of operating in a single plane of rotation as now required on conventional bearings.

A further important advantage of the integrated concept of this invention is the fact that the rotor itself may be made hollow to form an axial conduit for the flow of a pulp suspension. While a rotor may be integrated with, or may be driving a separate pulp treating component, (such as a refiner disk or a rotating screening element) a hollow rotor can substantially simplify the application of a pulp slurry to the working portion of the rotor, with reduced back pressure and lower pressure drop. Further, the entire unit may be integrated in such a manner that it can be quickly and easily placed into an in-line relationship with respect to existing conduits.

The use of a switch reluctance motor provides an ability to reduce noise. Further, such motor designs have the ability to alter rotational speeds very quickly, and this can be used to minimize high-frequency noise as now generated in such equipment.

Further, switched reluctance motors have been found to be more reliable than complex induction motors, providing easier start up and greater starting torque. The high starting torque means that the rotors can be shut down and started up again without the necessity for flushing out the rotors. As noted above, the rotors and stator of switched reluctance motors are singularly simple in construction and less subject to failure and lend themselves to integrated systems in which the rotor and even the stator can be in contact with the process liquid.

The elimination of conventional shaft sealing with oil/grease rotating assemblies eliminates a problem of maintenance, since such conventional equipment can fail due to water and/or pulp contamination through the seals and into the bearings.

The integration of the assembly removes the need for guarding the present type assemblies for safety purposes, to prevent exposed belts and pulleys operating at high speed and high power and inherently reduces the need for maintenance of such components. Where direct flexible couplings had been used before, these couplings are eliminated and therefore do not have to be maintained or guarded.

The overall installation and product costs to a consumer is reduced by reduced floor space, less complexity and weight, and by the flexibility of a totally sealed unit.

These and other objects and advantages of the invention will be apparent from the following description, the accompanying drawings and the appended claims.

BRIEF DESCRIPTION OF THE DRAWINGS

FIG. 2 is a diagrammatic longitudinal section through the rotor and stator portion of the refiner of FIG. 1;

FIG. 3 is a transverse sectional looking generally along the line 3—3 of FIG. 2 showing the location of the poles, and magnetic support bearings;

FIG. 4 is another sectional view looking generally along the line 4—4 of FIG. 2.

DETAILED DESCRIPTION OF PREFERRED EMBODIMENTS

Figure 1:
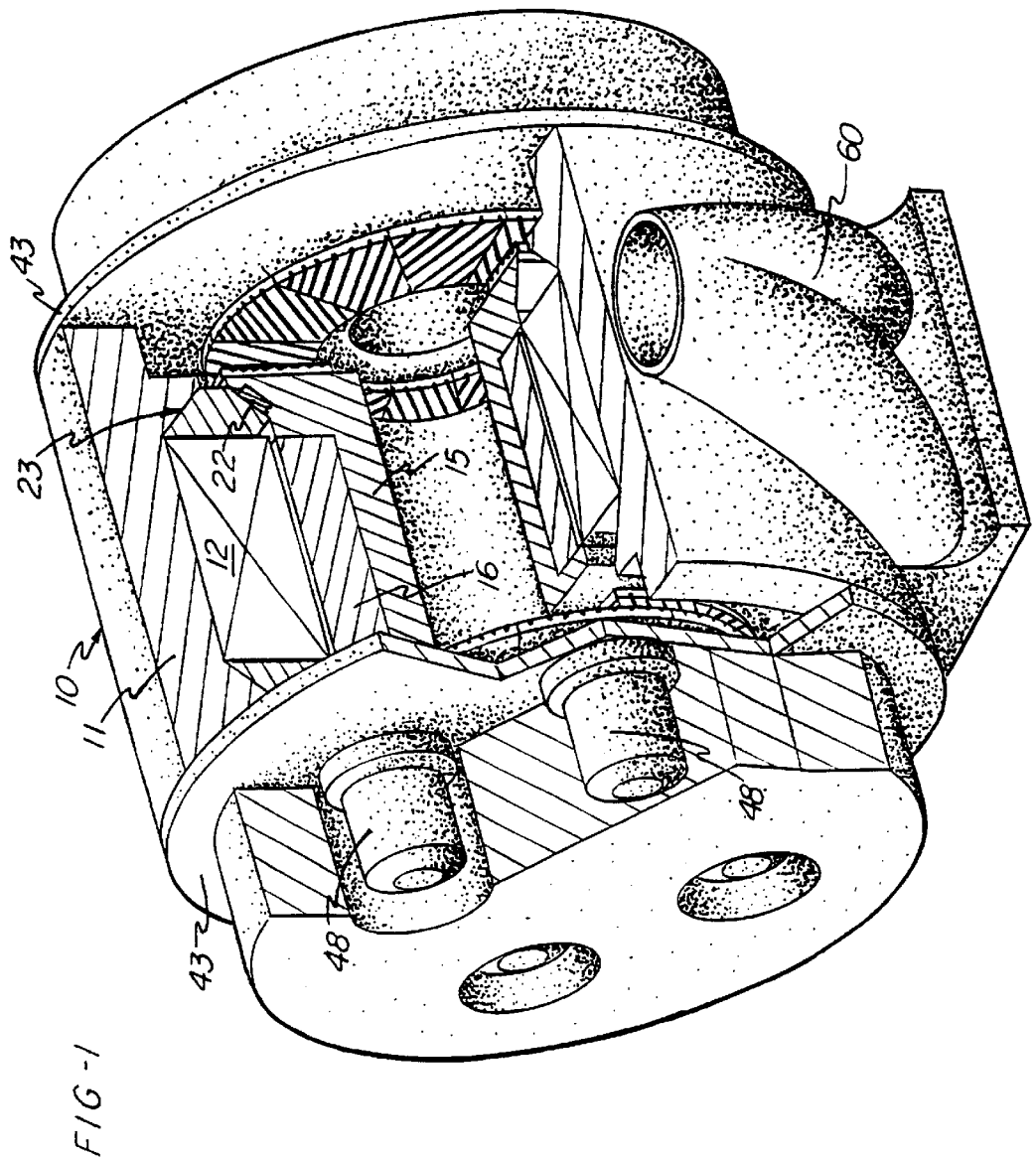
FIG. 1 is a cutaway perspective view of a paper pulp refiner having an integrated motor in accordance with this invention.

An integral enclosed paper pulp refiner in accordance with this invention is illustrated generally at 10 in FIG. 1. The refiner 10 incorporates some of the principles and advantages as described in the inventors' co-pending U.S. utility application Ser. No. 09/169,914 claiming the benefit of U.S. Provisional 60/061,491 filed Oct. 9, 1997, both of which are incorporated herein by reference relating to the support of a refiner shaft on magnetic bearings. Also, familiarity with paper pulp refiners, including radially positioned disk-type refiner plates with bar and groove patterns, is assumed. Reference may be had to the following U.S. Patents for the construction and operation of conventional disk-type refiners, including U.S. Pat. Nos. 2,666,368; 3,506,199; 2,986,434 and 4,171,101 incorporated herein by reference.

The use of magnetic bearings for supporting a rotating component, such as a shaft or rotor within the motor or other apparatus, is also understood by those skilled in the art. Such bearings can support a shaft with up to five degrees of movement. The bearings may be for radial support, for thrust or for both. They usually incorporate sensor apparatus by which the relative position of the rotating and non-rotating bearing parts is constantly measured. Magnetic bearings that control both radial forces and thrust forces are shown in U.S. Pat. Nos. 5,114,924 and 5,386,166, incorporated herein by reference. The control signal for measuring the distance between the object being supported and a stator may be a control signal superimposed upon the coils that operate to position the bearing rotor with respect to the bearing stator, in cases where the rotating member has two degrees of freedom of movement, as shown in U.S. Pat. No. 5,565,722 incorporated herein by reference. Additional patents that show control systems for magnetic bearings include U.S. Pat. Nos. 5,530,306 and 5,347,190, also incorporated herein by reference.

The preferred drive motor operates on the switched reluctance principle. The switched reluctance motor is preferred, although it is within the scope of the broader objects of this invention to use conventional (variable or constant speed) induction-type drive motor technology or a wrapped linear or traction-type rotor. The advantages of the switch reluctance motor have previously been described and the person skilled in the art is familiar with this type of motor and its electric control, as shown in U.S. Pat. Nos. 4,348,619; 4,253,058; 5,469,039 and 5,548,173, incorporated herein by reference. The switched reluctance motor has the advantage of a simple rotor design. However in some cases, permanent magnet rotor motors may be preferred as shown in U.S. Pat. Nos. 4,306,164 and 5,717,316.

The construction of the refiner 10 is described in relation to FIGS. 1–4. It will be understood that the construction has general symmetry about an intermediate plane and its central axis, and the sectional view of FIG. 2 shows apparatus at one end of the refiner which is repeated at the opposite end of the refiner, with the exception that the refiner may be fed at one end only with a suspension of papermaker's stock to be refined.

In the refiner embodiment of FIGS. 1–4, a switched reluctance motor is integrated into a disc-type refiner and therefore is free of any external rotating components. At present it is preferred to use a switched reluctance motor available from Switched Reluctance Devices, Ltd. Harrogate, U.K. As shown, the motor stator 11 has a plurality of equally spaced motor poles 12, two of which are shown in the cut away view of FIG. 1. In the sectional view of FIG. 4, four stator poles 12 are illustrated separated by air gaps or by non-magnetic spacers 13. As previously noted, the switched reluctance motor may have more than four poles, such as six or more but for the purpose of illustration, four stator poles are shown. It will also be understood that the stator poles 12 will incorporate or have windings associated with them for energization in opposed pairs but for the sake of clarity, the windings, as such, have not been shown.

A rotor 15 is mounted within the stator 11 for rotation and also is formed with four poles 16 separated by non-magnetic portions 17. The rotor, in this integrated construction, preferably runs wet, that is it runs within the liquid of the stock suspension. Since it is normally desired to isolate the windings of the stator 11 from the liquid content, a water impervious non-magnetic shield 18 separates the stator 11 from the rotor 15, as shown in FIG. 2.

The rotor 15 is mounted for rotation, adjacent the ends of the rotor, exclusively on magnetic bearings. For this purpose, the rotor in longitudinal cross-section is somewhat dumbbell shaped in that its remote ends are enlarged slightly in respect to the diameter at the center, at the stator poles. This enlargement of the rotor forms opposed conically inclined surfaces, at each end thereof, on which is mounted the rotor components 22 of the magnetic bearings 23. The stator components 24 are mounted on the dry side of the shield 18, although it is within the scope of this invention to run both sides of the magnetic bearing pairs in process fluid. The stator components are separated by air spaces or by non-magnetic spacers 25 as shown in FIG. 3.

Four electromagnets 23 are utilized at each enlarged end of the rotor 15 and are spaced in quadrature relation as shown in FIG. 3. By mounting the electromagnets 23 with respect to conical surfaces on the rotor, the electromagnets 23 can function both in axial and in radial thrust and can position the rotor 15 with up to five degrees of movement, within the motor 10.

The motor housing 10 defines a pair of substantially identical pulp refiner compartments 35, one at each of its opposite ends. (See FIG. 2.) The rotor 15 is formed, at each end, with a radial end face 40. The end faces 40 support a rotating refiner disk or plate 41 thereon, one each in each of the compartments 35.

The refiner compartments 35 are closed by end plates 43, and each end plate 43 supports a non-rotating refiner plate 45 in opposed relation to the rotating plate 41 within the compartment. The axial position of the non-rotating refiner plate 45 may be adjusted on the associated end plate 43 by micro-drive adjuster motors 48, to create a refiner gap of adjustable clearance between the opposed faces of the refiner plates. It will be understood that the refiner plates may have a bar and groove pattern, as well known in the art. It will also be understood that the refiner plates 41 and 45 may be constructed with removable, individual plates circumferentially arranged, also as well known in the art, and as illustrated in FIG. 1.

As previously noted, the rotor 15 is hollow with a central passage 50 therethrough extending from end to end. The passage 50 opens into an opening 52 in the plate 41 and to an aligned opening 53 in the plate 45. The opening 53 is in communication with a flanged inlet 55 formed on one of the motor end plates 43. The opposite plate may be closed, i.e., not formed with an inlet or outlet opening. Of course the opposite plate may also include an axially disposed fluid flow opening therein. In some cases axial fluid feed can be made through the first end plate to the first refiner zone with the fluid then flowing outside the stator to the second plate for serial flow from a first refiner zone to a second.

Also, a pressure transducer or the like may be positioned in or near one of the end plates, preferably the second end plate. This could measure the pressure drop through the rotor center and serve as a signal to a controller to control the pressure of the fluid flowing through the rotor.

A suspension of papermaking pulp to be refined is applied to the refiner 10 at the flanged inlet 55, where the flow is split or divided, half going to the first pair of refiner plates and the other half flowing through the axial passage 50 in the rotor to a second pair of refiner plates at the opposite refiner compartment. Each of the compartments 35, at their radial outer ends, open into an involute passage having a common outlet 60, as shown in FIG. 1, by which the refined stock material is removed from the refiner 10. While the flanged opening 55 has been defined as an inlet and the involute passage leading to the compartments 35 has been defined as an outlet, it should be understood that these functions may be reversed in appropriate instances, depending upon the application of the refiner.

The open rotor concept, with the through passage 50, eliminates the inherent problems of feeding a double disc refiner through non-axial openings formed in one or more of the disk plates. The construction shown is fully balanced in that rotating disks 41 are supported on the opposite radially flat surfaces 40 of the rotor 15 in close adjacent relation to one of the magnetic bearing sets. The rotor or additional elements may be modified to cause a propulsion or a pumping effect on the process fluid. It should be understood that it is not necessary to maintain a 50—50 split of flow to the respective refiner compartments 35. For example, the micropositioners 48 in either of the end plates 43 may be controlled in such a manner as to provide for on-line or active flow adjustments, by creating different back pressures in the respective compartments 35. In this manner, the microadjusters 48 may be used as active flow dividers for the purpose of achieving an optimum or desired result, in which less than half of the flow will go to one of the refiner plate pairs and more than half of the flow will go to the other refiner plate pairs, and this process may similarly be computer controlled. In addition to the microadjusters shown, other linear drive devices such as a ball screw drive could be provided to adjust the actual position of the end plates.

The magnetic bearings 23 support the entire rotating assembly accurately within the motor frame and in relation to the non-rotating or stator refiner plates 45. Bearings of the type shown at 23 are referred to as conical magnetic bearings and are commercially available through Revolve Magnetic Bearings Inc., Calgary, Canada. Some axial adjustment at the magnetic bearings is permitted to control the exact refiner gap 52 while the non-rotating refiner plate 45 may also be positioned by the individual actuators 48 in the end plates 43. Refiner gap clearances as well as motor speed, and magnetic bearing signals can be provided by a common controller, not shown. Refiner gap, gap loss (wear) and plate deflections may be monitored and a process signal fed to a controller and shown in U.S. Pat. No. 4,820,980. The ability to provide active rotor positioning and orbit path using the magnetic bearings permits improved process efficiency. The rotating parts do not contact one another, so that part wear and power is minimized, and utilization time is maximized. The pulp quality can be based on a feedback control, and rotor position and orbit path can be tuned to optimize pulp quality. Uniformity is also improved in that the dimensions and relationship between the rotor and stator elements may be maintained throughout the life of the unit, to compensate for wear, so that the performance remains constant.

Since the switch reluctance motor can be operated at variable speeds, the ability to vary speed and integrate speed variations with pulp parameters permits a further improvement in uniformity of the pass through product. Accordingly, speed, among other parameters, can be used as a control of pulp quality or energy usage.

The integrated refiner 10 permits start-up alignment and the operation to be automated, and can thereafter be controlled according to downstream parameters. Shaft shields and oil/grease rotating assemblies are eliminated and therefore cannot fail as now they commonly do by reason of water or pulp contamination from leaking seals. Quieter operation may be assured by permanent alignment of the drive motor rotor and the refining rotating components. There are no exposed rotating components. Space and weight are saved by reason of the integration of the motor with the process equipment. Installation and maintenance are accordingly simplified.

The magnetic bearings 23 are in two parts, one rotary and one stationary. Individual radial and axial thrust bearings may be used in place of the mutually and oppositely inclined bearing supports. The arrangement shown combining both radial and axial thrust permits alignment as well as control of orbit. While four circumferential locations are shown for the magnetic bearings, only a minimum of three such points are required, with four providing greater stability and control. One or both parts of the magnetic bearings may be submerged in the process fluid for simplicity of design and for cooling purposes.

Figure 5:
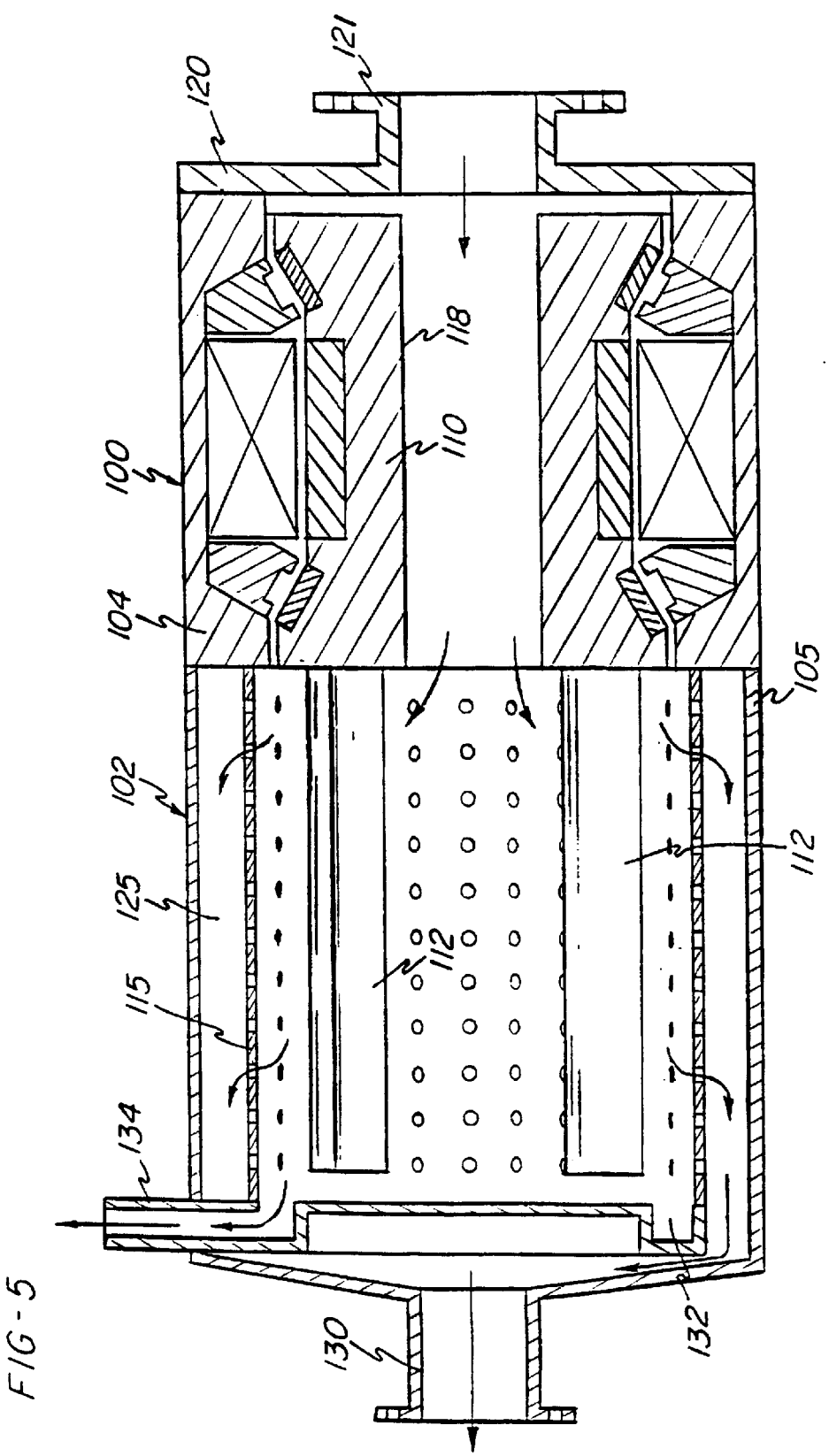
FIG. 5 is a diagrammatic sectional view of an integrated pressure screen according to this invention.

FIG. 5 illustrates a further form of paper pulp processing machinery in which a drive motor can be integrated into the system, to provide essentially a compact in-line processor. In FIG. 5, a switched reluctance drive motor 100 is employed and for the purpose of this disclosure may be identical to the drive motor described above in connection with FIGS. 1–4. The motor 100 is integrally associated with a pulp pressure screen section 102 and in axial alignment therewith such that the case or frame 104 of the motor 100 is attached to or forms part of the outer housing 105 of the pressure screen. The motor rotor 110 is drivingly or directly coupled to rotating foils 112 or other turbulence inducing device that rotates within a stationary cylinder type screen 115. In some embodiments, the cylinder is rotated, and the foils/turbulence generators are stationary.

The pulp suspension to be screened is brought in axially through the center opening 118 through the rotor. The back wall or frame 120 is flanged at 121 to connect to a supply pipe which brings the pulp suspension into the rotor. The suspension will flow through the rotor and exit directly into the interior of the pressure screen section 102 for outward flow to the inside surface of the stationary screen 115 for separation of impurities and screening in the conventional manner. The accepts flow into an annular chamber 125 between the stationary screen 115 and the outer housing 105 of the screening section 102, and turn axially to flow out of a common accepts port 130. Rejects which fail to pass through the screen openings or slots are collected in an annular chamber 132 for flow outwardly through a rejects opening 134.

The extreme simplicity of this embodiment of the invention, as compared to a conventional pressure screening cylinder is readily apparent. The rotating structure of the screening cylinder, namely the foils 112 or other conventional rotating structure, is mounted on and driven directly by the rotor 110 and is suspended by the same bearings that suspend and support the motor rotor 110. Preferably, magnetic bearings are used as in the embodiment of FIGS. 1–4, although it should be understood that many of the advantages of the in-line integrated system of FIG. 5 can be achieved with the motor rotor being mounted on fluid film or other conventional bearings.

The system as illustrated in FIG. 5 has a further advantage of the rotor 110 being operated "wet". That is, the pulp suspension flowing through the rotor cools the rotor and is permitted also to flow around the circumference of the rotor to cool the stator poles and to cool the magnetic bearings. If desired, the stator poles and the stator portions of the magnetic bearings may be isolated with a non-magnetic membrane as previously disclosed in connection with the embodiment of FIGS. 1–4.

Not only is the screening apparatus a substantial simplification, it is also controllable as to power and speed over wide ranges to obtain optimum screening quality of the accepts, by reason of the wide speed control capabilities of the motor 100. Also, as in the case of the preceding embodiment, all rotating components are fully enclosed.

While the above embodiments have been shown in which the outer portion of the motor, normally referred to as the stator, is non-rotating, it will be understood by those skilled in the art that the functions may be reversed, that is, the power to the motor may be applied to a stationary central stator in which a rotor rotates around the stator. Such an arrangement would be advantageous, for example, in reducing the axial length of a paper pulp screen by positioning the motor stator and rotor within the interior of the screen in which the rotor carries the foils around the stator. In such a construction, the stator could be formed with an axial inlet for admitting the process fluid.

In general, the invention therefore relates to the following:

An improved processing machinery that incorporates an integrated drive internal drive motor free of external or exposed rotating components.

An integrated drive motor for rotating processing machinery that has a rotating component mounted on magnetic bearings, and preferably employs switched reluctance technology thereby permitting the motor drive as well as the rotor support to be controlled electronically and permits torque, speed, and rotor position to be controlled according to downstream process conditions.

More particularly, an integrated paper pulp refiner is disclosed having rotating refiner plates secured directly to a motor rotor, and the orbit path, speed, and clearance between the rotating plates and stationary plates are electronically controlled.

In processing machinery, as described above, the processing liquid may pass through or around the motor rotor, cooling the rotor, providing cooling for the stator, and also cooling the magnetic bearings. By passing through the rotor, the process fluid may be applied more directly to the processing apparatus with reduced complications and back pressures.

Pressure screening apparatus for screening a suspension of paper makers stock includes a screen, and a rotor within the screen, in which the rotor is driven directly by an axially aligned rotating component of an electric motor. The rotating component may be supported on magnetic bearings integrated with the motor. The rotating motor component may be hollow or have an axial passage for the inflow or outflow of process liquid to the screen. The rotor may assist in process fluid movement.

In all embodiments, the motor may be a switched reluctance motor, and a controller common to the motor and magnetic bearings provides real time process control. Also, individual units may have their own proprietary control systems integrated together to form a common control system.

Additionally, in accordance with the methods disclosed herein, methods of processing a pulp suspension are provided wherein a paper pulp processing component is brought into contact with the pulp. In such systems, a variable speed motor having a stator and a rotor, with the rotor rotatably mounted along a longitudinal axis within the stator, is provided. The rotatable pulp processing component and rotor are combined along an integrated, common shaft. Bearings, such as magnetic bearings, are positioned along the shaft and the stator to support both the rotatable pulp processing component and the rotor. In many cases, as above-indicated, the rotor shaft will be hollow and fluid flow will be permitted therethrough so as to help cool the motor and provide a central, axially oriented input for the pulp stock being fed to the pulp and paper processing apparatus.

What is claimed is:

1. A disk refiner comprising a switched reluctance motor comprising a stator and a rotor rotatably disposed along a longitudinal axis within said stator, said rotor carrying a refiner plate, a second refiner plate positioned along said longitudinal axis and adjacent said first refiner plate, and magnetic bearings operatively associated with said stator and rotor for supporting said rotor, the disk refiner further comprising an end plate adjacent said stator and rotor and having said second refiner plate mounted thereon, and linear movement actuator means for selectively moving said second refiner plate along said longitudinal axis toward and away from said first refiner plate.

2. A disk refiner comprising a switched reluctance motor comprising a stator and a rotor rotatably disposed along a longitudinal axis within said stator, said rotor having a first end carrying a first refiner plate and a second end carrying a second refiner plate, first end plate spaced axially from said first refiner plate and a second end plate spaced axially from said second refiner plate with said first and second end plates and said stator defining an enclosed housing, a third refiner plate mounted on said first end plate and axially spaced from said first refiner plate, a fourth refiner plate mounted on said second end plate and axially spaced from said second refiner plate, and magnetic bearings operatively associated with said stator and rotor for levitatingly supporting said rotor with said stator, the disk refiner further comprising a first linear actuator means for selectively moving said third refiner plate along said longitudinal axis toward and away from said first refiner plate and a second linear actuator means for selectively moving said fourth refiner plate along said longitudinal axis toward and away from said second refiner plate.

3. An apparatus comprising a motor having a stationary member and a submersible rotatable drive member, bearing means for supporting said submersible rotatable drive member and a submersible rotatable processing component carried by said rotatable drive member, said bearing means controlling axial and radial movement of said rotatable drive member relative to said stationary member, said stationary member being disposed along a longitudinal axis within said rotatable drive member, said rotatable pulp processing component being a screen cylinder.

4. A paper pulp processing apparatus comprising a variable speed motor having a stator and a rotor rotatably disposed along a longitudinal axis within said stator, a rotatable pulp processing component carried by said rotor, and magnetic bearings supporting said rotor and said rotatable pulp processing component and controlling axial and radial movement of said rotatable pulp processing component relative to said stator, said apparatus further comprising a hollow rotor and a hollow shaft rotatable pulp processing component for feeding paper pulp suspension through both said rotor and rotatable pulp processing component.

5. A paper pulp processing apparatus as recited in claim 4 wherein said variable speed motor is a switched reluctance motor.

6. A paper pulp processing apparatus as recited in claim 5 wherein said rotatable pulp processing component comprises a refiner disk and wherein said paper pulp apparatus is a disk refiner.

7. A paper pulp processing apparatus as recited in claim 6 wherein said rotatable pulp processing component comprises a fluid foil and wherein said paper pulp apparatus is a screen cylinder.

8. A paper pulp processing apparatus as recited in claim 5 wherein said rotatable pulp processing component is a rotatable screen cylinder.

9. A paper pulp processing apparatus comprising a variable speed motor having a stator and a rotor rotatably disposed along a longitudinal axis within said stator, a rotatable pulp processing component carried by said rotor, and magnetic bearings supporting said rotor and said rotatable pulp processing component and controlling axial and radial movement of said rotatable pulp processing component relative to said stator, wherein a portion of said rotor comprises an inclined surface positioned adjacent an inclined surface of said stator, said magnetic bearings positioned along said inclined surfaces and controlling both axial and radial positioning of said rotor and said rotatable pulp processing component relative to said stator.

10. A disk refiner comprising a switched reluctance motor comprising a stator and rotor rotatably disposed along a longitudinal axis within said stator, said rotor carrying a refiner plate, a second refiner plate positioned along said longitudinal axis and adjacent said first refiner plate, and magnetic bearings operatively associated with said stator and rotor for supporting said rotor, wherein said first refiner plate comprises an opening therein and wherein said rotor comprises a hollow shaft communicating with said opening in said first refiner plate to define a fluid flow input for feeding a pulp suspension between said first and second refiner plates.

11. A disk refiner comprising a switched reluctance motor comprising a stator and a rotor rotatably disposed along a longitudinal axis within said stator, said rotor carrying a refiner plate, a second refiner plate positioned along said longitudinal axis and adjacent said first refiner plate, and magnetic bearings operatively associated with said stator and rotor for supporting said rotor, wherein said first refiner plate is attached to said rotor at a first end surface of said rotor, said first end surface of said rotor positioned within a first end of said stator along a first end surface of said stator said first end surface of said rotor and said first end surface of said stator together presenting a pair of inclined surfaces, and where said magnetic bearings are positioned along said inclined surfaces for controlling axial and radial positioning of said rotor within said stator.

12. A disk refiner comprising a switched reluctance motor comprising a stator and a rotor rotatably disposed along a longitudinal axis within said stator, said rotor having a first end carrying a first refiner plate and a second end carrying a second refiner plate, a first end plate spaced axially from said first refiner plate and a second end plate spaced axially from said second refiner plate with said first and second end plates and said stator defining an enclosed housing, a third refiner plate mounted on said first end plate and axially spaced from said first refiner plate, a fourth refiner plate mounted on said second end plate and axially spaced from said second refiner plate, and magnetic bearings operatively associated with said stator and rotor for levitatingly supporting said rotor within said stator, wherein said first end plate, second refiner plate and first refiner plate comprise openings therein, said rotor comprising a hollow shaft in communication with said openings in said first and second refiner plates and said first end plate to define a fluid flow input for feeding a pulp suspension between said first and third refiner plates and between said second and fourth refiner plates.

13. A disk refiner comprising a switched reluctance motor comprising a stator and a rotor rotatably disposed along a longitudinal axis within said stator, said rotor having a first end carrying a first refiner plate and a second end carrying a second refiner plate, a first end plate spaced axially from said first refiner plate and a second end plate spaced axially from said second refiner plate with said first and second end plates and said stator defining an enclosed housing, a third refiner plate mounted on said first end plate and axially spaced from said first refiner plate, a fourth refiner plate mounted on said second end plate and axially spaced from said second refiner plate, and magnetic bearings operatively associated with said stator and rotor for levitatingly supporting said rotor within said stator, wherein said first end of said rotor borders said stator along a first inclined surface and wherein said second end of said rotor borders said stator along a second inclined surface and wherein said magnetic bearings are positioned along both said first and second inclined surfaces to control axial and radial positioning of said rotor within said stator.

14. A screen for screening a flow of papermaker's stock comprising a switched reluctance motor having a stator and a rotor rotatably disposed along a longitudinal axis within said stator, a screen adjacent said stator and having an accepts surface and a fluid inlet surface, a housing surrounding said screen, a fluid foil carried by said rotor to induce a flow of papermaker's stock along said fluid inlet surface of said screen, a first collection channel communicating with said accepts surface to collect fluid flowing through said screen, a second collection channel communicating with said fluid inlet surface to collect fluid that does not flow through said screen, and magnetic bearings operatively associated with said stator and rotor for levitatingly supporting said rotor.

15. A screen as recited in claim 14 wherein said rotor comprises a hollow shaft defining a fluid inlet channel to feed said papermaker's stock to said fluid foil.

16. A screen as recited in claim 14 wherein said fluid foil is integral with said rotor and where said fluid foil comprises apertures therein for forwarding said papermaker's stock from said inlet channel to said fluid inlet surface.

17. A screen as recited in claim 14 wherein said magnetic bearings comprises radial magnetic bearings disposed about said rotor to control radial positioning of said rotor in said stator and said magnetic bearings also comprise axial magnetic bearings disposed along said rotor to control axial positioning of said rotor within said stator.

18. In a method of processing a pulp suspension wherein a rotatable pulp processing component is brought into contact with said pulp, the improvement comprising (a) providing a variable speed motor having a stator and a rotor rotatably mounted along a longitudinal axis within said stator;

(b) combining said rotatable pulp processing component and said rotor along a common shaft, wherein said variable speed motor is a switched reluctance motor and said shaft is hollow;

(c) providing magnetic bearings along said common shaft and said stator to support both said rotatable pulp processing equipment and said rotor and control axial and radial movement of said rotatable pulp processing component relative to said stator; and (d) providing a fluid flow through said hollow shaft.

19. A paper pulp processing apparatus comprising a motor having a stationary member and a rotatable drive member having conical ends, a rotatable pulp processing component carried by said rotatable drive member, and bearings supporting the conical ends of said rotatable drive member and said rotatable pulp processing component, said bearings controlling axial and radial movement of said rotatable drive member relative to said stationary member.

20. A paper pulp processing apparatus comprising a variable speed motor having a stator and a rotor having conical ends rotatably disposed along a longitudinal axis within said stator, a rotatable pulp processing component carried by said rotor, and magnetic bearings supporting the conical ends of said rotor and said rotatable pulp processing component and controlling axial and radial movement of said rotatable pulp processing component relative to said stator.

21. A disk refiner comprising a switched reluctance motor comprising a stator and a rotor having conical ends rotatably disposed along a longitudinal axis within said stator, said rotor carrying a refiner plate, a second refiner plate positioned along said longitudinal axis and adjacent said first refiner plate, and magnetic bearings operatively associated with said stator and rotor for supporting the conical ends of said rotor, and controlling axial and radial movement of the rotor.

22. A disk refiner comprising a switched reluctance motor comprising a stator and a rotor having conical ends rotatably disposed along a longitudinal axis within said stator, said rotor having a first end carrying a first refiner plate and a second end carrying a second refiner plate, a first end plate spaced axially from said first refiner plate and a second end plate spaced axially from said second refiner plate with said first and second end plates and said stator defining an enclosed housing, a third refiner plate mounted on said first end plate and axially spaced from said first refiner plate, a fourth refiner plate mounted on said second end plate and axially spaced from said second refiner plate, and magnetic bearings operatively associated with said stator and rotor for levitatingly supporting the conical ends of said rotor with said stator and for controlling axial and radial movement of the rotor.

23. In a method of processing a pulp suspension wherein a rotable pulp processing component is brought into contact with said pulp, the improvement comprising:

a.) providing a variable speed motor having a stationary member and a rotatable drive member;

b.) combinining said rotatable pulp processing component and said rotatable drive member into an integral unit; and c.) providing bearings along said rotatable pulp processing component and said rotatable drive member to support conical ends of said rotatable drive member within said stationary member, and controlling axial and radial movement of said pulp processing component relative to said stationary member by said bearings.

24. In a method of processing a pulp suspension wherein a rotatable pulp processing component is brought into contact with said pulp, the improvement comprising:
   a.) providing a variable speed motor having a stator and a rotor rotatably mounted along a longitudinal axis within said stator;
   b.) combining said rotatable pulp processing component and said rotor along a common shaft; and
   c.) providing magnetic bearings along said common shaft and said stator to support both said rotatable pulp processing equipment and conical ends of said rotor and control axial and radial movement of said rotatable pulp processing component relative to said stator.

* * * * *